United States Patent
Bolen

[11] Patent Number: 6,126,461
[45] Date of Patent: Oct. 3, 2000

[54] SOUND DAMPENING SPRING FINGERS TO REDUCE HUB/ROTOR VIBRATION NOISE

[75] Inventor: Patrick Bolen, Carthage, Ill.

[73] Assignee: Methode Electronics, Inc., Chicago, Ill.

[21] Appl. No.: 09/271,844

[22] Filed: Mar. 18, 1999

[51] Int. Cl.$^7$ ....................................................... H01R 3/00
[52] U.S. Cl. ............................................. 439/164; 439/15
[58] Field of Search ............................... 439/164, 15, 13, 439/22, 27, 492

[56] References Cited

U.S. PATENT DOCUMENTS

| | | | |
|---|---|---|---|
| 5,429,517 | 7/1995 | Bolen | 439/164 |
| 5,490,793 | 2/1996 | Bolen | 439/164 |
| 5,580,259 | 12/1996 | Bolen et al. | 439/164 |
| 5,637,005 | 6/1997 | Bannai et al. | 439/164 |
| 5,917,163 | 6/1999 | Lecznar et al. | 200/61.54 |
| 5,980,286 | 11/1999 | Best et al. | 439/164 |

*Primary Examiner*—Lincoln Donovan
*Assistant Examiner*—Kyung S. Lee
*Attorney, Agent, or Firm*—Karl D. Kovach; David L. Newman

[57] ABSTRACT

A clockspring having spring fingers so as to resistant vibratory motion of the hub. The clockspring includes a housing and a cover mounted to the housing so as to form a cavity therebetween. The hub is rotatably mounted in the cavity. Clearance is provided between the hub and both the housing and the cover. The spring fingers are attached to both the housing and the cover, the spring fingers press against the hub so as to eliminate or reduce the audible sounds due to the vibratory motion of the hub.

4 Claims, 4 Drawing Sheets

SOUND DAMPENING SPRING FINGERS TO REDUCE HUB/ROTOR VIBRATION NOISE

BACKGROUND OF THE INVENTION

1. Field of the Invention

The present invention pertains to a device for damping vibrations. The invention more particularly concerns the reduction or elimination of vibrations of a hub contained within an automotive clockspring.

2. Discussion of the Background

Devices are well known in the art for damping the sound emanating from automobile clocksprings due to the vibration of the hub or rotor contained within the clockspring housing. An automotive clockspring is an electrical connector or rotary transducer which electrically connects a rotatable airbag assembly mounted on the steering column to stationary crash sensors located elsewhere on the vehicle. An automotive clockspring typically includes a housing and a cover mounted to the housing so as to from a cavity therebetween. Rotatably mounted within the cavity is a hub. The clockspring housing is non-rotatably mounted to the steering column, while the hub is attached to the rotatable airbag assembly. Electrical cable is typically wound around the hub. One end of the electrical cable terminates at the stationary housing or cover and the other end terminates at the hub. The end of the electrical cable terminated at the hub is then connected to an electrical cable which connects to the airbag assembly. During use, the electrical cable is either spooled or un-spooled around the hub when the steering wheel is turned in one direction or the other direction.

It is desirable to have a clockspring which requires very little torque to rotate the hub relative to the stationary housing and cover. Any increase in torque is felt by the driver of the vehicle as rotational resistance of the steering wheel when the steering wheel is rotated. One way of reducing the torque is to provide a clearance fit between the hub and both the housing and the cover within the cavity. Such a clearance fit allows the hub to freely rotate, with little applied torque, within the cavity of the clockspring. A drawback of such a solution is that the hub vibrates and moves around, translationally, within the provided clearance and contacts the housing and cover. The resulting contact is perceived as undesirable audible noise within the passenger compartment of the vehicle. The source of the vibratory energy that causes the hub to vibrate can be from the rotation of the steering wheel or it can be from vibrational energy passing through the steering column from the engine, chassis or wheels.

One solution to reduce the noise, while maintaining the clearance between the hub and the housing, is to place a lubricant within the clearance of the clockspring. Typically the lubricant is a liquid, a solid carried by a solvent, or a solid material which is either malleable or is in many small pieces (i.e., for example, graphite particles). The lubricant dampens the motion of the hub through the clearance, since the hub must physically displace the lubricant before the hub contacts the housing or cover. Disadvantages of this solution are that the viscosity of lubricants generally greatly increases as the temperature decreases, thus greatly increasing the torque required to rotate the hub; and with time and use lubricants tend to migrate out of the clearance, which results in undesirable vibration of the hub. Furthermore, assembling clocksprings with a lubricant adds to the complexity of the assembly process by handling the lubricant which fouls the workplace, increases the number of parts, and increases the cost of the finished product.

Thus, there is a need for a low cost, reliable, and simple to manufacture clockspring which does not generate audible vibratory sounds.

SUMMARY OF THE INVENTION

Therefore, it is an object of the present invention to provide a clockspring having a small number of parts which has a minimal number of assembly steps and is manufactured for a low cost. It is a further object of the invention to provide a clock spring which does not radiate noise from the hub of the clockspring.

In one form of the invention the clockspring includes a housing and a cover which is mounted on the housing so as to form a cavity. Rotatably mounted within the cavity is a hub. The hub has an axis of rotation. To dampen translatory motion of the hub within the cavity, the housing has first spring fingers and the cover has second spring fingers. Each of the first spring fingers have a nub, where each nub contacts the hub and urges the hub towards the axis of rotation of the hub, thus centering the hub. The nubs of the second spring fingers of the cover contact the hub and urge the hub towards the housing.

Thus, Applicant's invention is superior to the prior art. Applicant's invention provides a clockspring which reduces or prevents audible noise from being generated due to the motion of the hub without using lubricants. Therefore, the cost and complexity of manufacturing the clocksprings is reduced and the reliability is increased. These and other features of the invention are set forth below in the following detailed description of the presently preferred embodiments.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PRESENTLY PREFERRED EMBODIMENT

Figure 1:
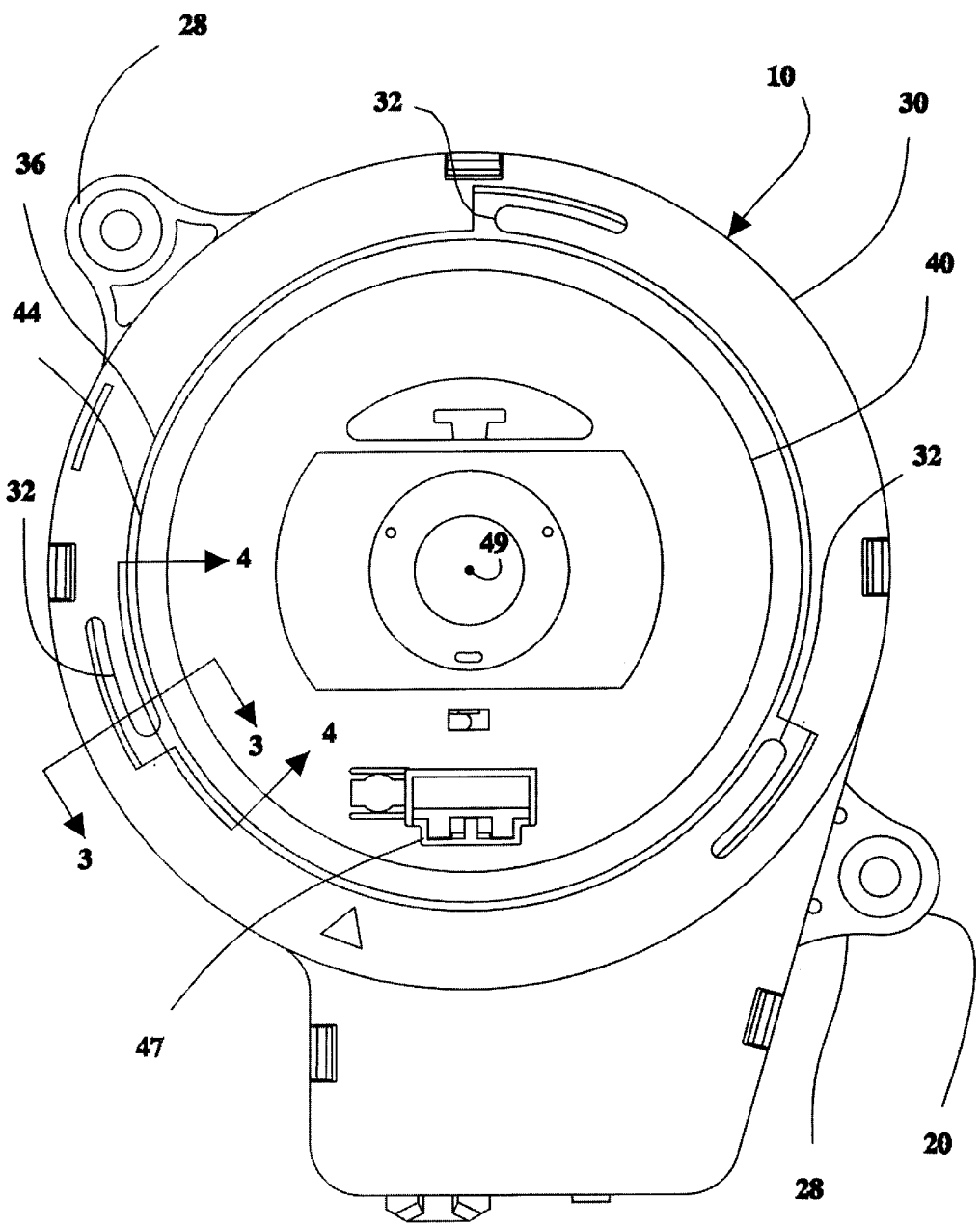
FIG. 1 is a top view of a clockspring of the present invention.

Referring now to the drawings, wherein like reference numerals designate identical or corresponding parts throughout the several views, and more particularly to FIGS. 1–4 thereof, a first embodiment of the present invention is a clockspring 10 having first spring fingers 22 (see FIG. 1) and second spring fingers 32 (see FIG. 2) displayed therein. FIG. 1 is a top view of a clockspring 10 showing a housing 20, a cover 30 and a hub 40. In FIG. 1, the mounting bosses 28 of the housing 20 are the only visible portion of the housing 20. The cover 30 is mounted to the housing 20 by way of mating snap-style detents which are not shown. When the cover 30 is mounted on the housing 20 a cavity is formed therebetween. Within the cavity is placed the hub 40. The hub 40 has an axis of rotation 49 about which it rotates relative to the housing 20 and the cover 30.

During assembly, the hub 40 has electrical cable wrapped around it and then the hub 40 is placed in the housing 20.

Figure 2:
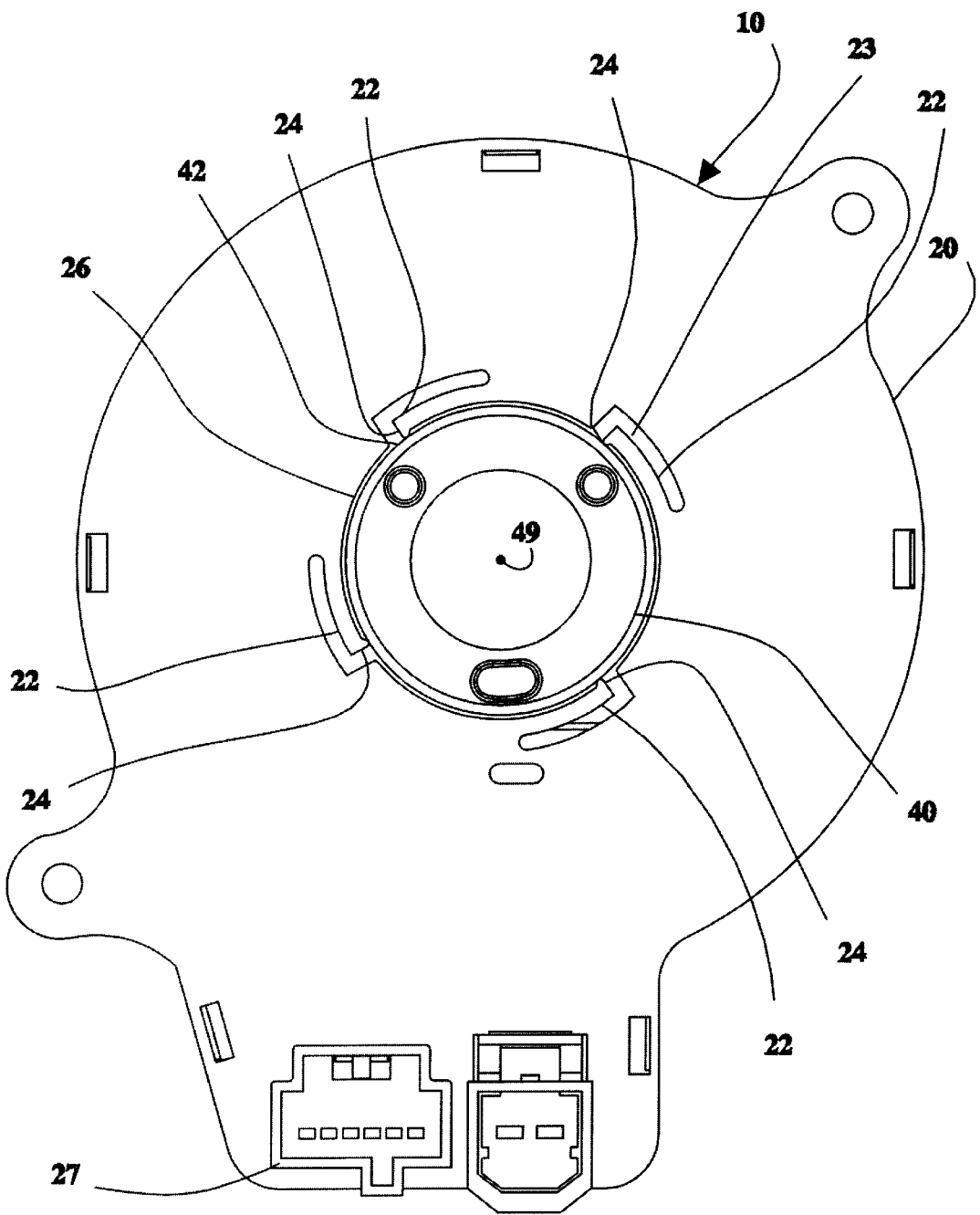
FIG. 2 is a bottom view of the clockspring of the present invention of FIG. 1.

One end of the electrical cable terminates at the hub terminator 47 and the other end terminates at the housing terminator 27 (see FIG. 2). Then, the cover 30 is mounted to the housing 20. The cavity formed between the cover 30 and the housing 20 is dimensioned so as to provide clearance between the hub 40 and both the housing 20 and the cover 30. Furthermore, a first opening 26 of the housing 20 is also dimensioned so as to provide a clearance between it and a first shoulder 42 of the hub 40. The second opening 36 of the cover 30 is dimensioned so as to provide a clearance between itself and a second shoulder 44 of the hub 40. The second opening 36 of the cover 30 is provided to support, at discrete locations, the second shoulder 44 of the hub 40.

The clearance supplied by the parts allows the hub 40 to, generally, rotate freely within the cavity so as to provide a clockspring which can rotate with a low amount of friction. Since clearances exist, the hub 40 is susceptible to vibratory motions which may result in audible noise since the hub 40 can impact the housing 20 and the cover 30. To prevent such motion, first spring fingers 22 attached to the housing 20, and second spring fingers 32 attached to the cover 30 are provided so as to stabilize the hub 40. The first and second spring fingers 22 and 32 stabilize the hub 40 by pressing against the hub 40. The first and second spring fingers 22 and 32 are made of an elastic material, such as a polymer, and provide spring forces to the hub 40.

The first spring fingers 22 of the housing 20 urge the hub 40 toward the axis of rotation 49 of the hub 40 when the rotational axis 49 of the hub 40 deviates from the center of the cavity. The first spring fingers 22 shown in FIG. 2 contact the hub 40 at the first shoulder 42 of the hub 40. As such, the first spring fingers 22 tend to center the hub 40 within the housing 20 and to reduce the lateral vibration of the hub 40.

The first spring fingers 22 are dimensioned so as to be positioned closer to the rotational axis 49 of the hub 40 than is an edge of the first opening 26 of the cover 20. The first spring fingers 22 are dimensioned so as to provide a line-to-line fit with the first shoulder 42 of the hub 40. As such, the first spring fingers 22 do not contribute to any significant parasitic frictional drag torque when the hub 40 is centered within the cavity. However, once the rotational axis 49 of the hub 40 travels away from the center of the cavity, some of the first spring fingers 22 deflect thus providing a spring force to the hub 40 as a result of the deflection of the spring fingers 22.

Four first spring fingers 22 are shown in FIG. 2, however, any number of spring fingers can be used. The first spring fingers 22 take the form of cantilevered fingers protruding from the housing 20 and act as resilient springs. As shown in FIG. 2, the first spring fingers 22 have a slight arcuate shape. However, the first spring fingers 22 do not need to be the shape as shown. Instead, any attachment or spring can be interposed between the housing 20 and the hub 40 to serve the same purpose. In a preferred embodiment, the first spring fingers 22 are integrally molded with the cover 20 made of an injection moldable polymer material, preferably ABS, that provides sufficient strength of the spring fingers 22 to prevent breakage, but also having adequate resiliency so that the first spring fingers 22 do not deflect all of the way through the first gap 23 so as to contact the cover 20.

In order to reduce friction between the first spring fingers 22 and the first shoulder 42 of the hub 40, the area of contact between the two parts is made as small as is reasonably possible. Therefore, one nub 24 is provided for each of the first spring fingers 22 at a free end of each of the first spring fingers 22. The nubs 24 protrude from the first spring fingers 22 towards the first shoulder 42 of the hub 40. The area of contact between the hub 40 and the first spring fingers 22 is limited to the contact area between the first shoulder 42 of the hub 40 and the nubs 24 of the first spring fingers 22 of the cover 20. As such, the amount of torque required to overcome the frictional resistance between the cover 20 and the hub 40 is kept to a minimum. Furthermore, the size and shape of the nubs 24, as shown in FIG. 2, are only one example of many acceptable sizes and shapes that provide the low friction contact between the first spring fingers 22 and the hub 40.

Figure 3:
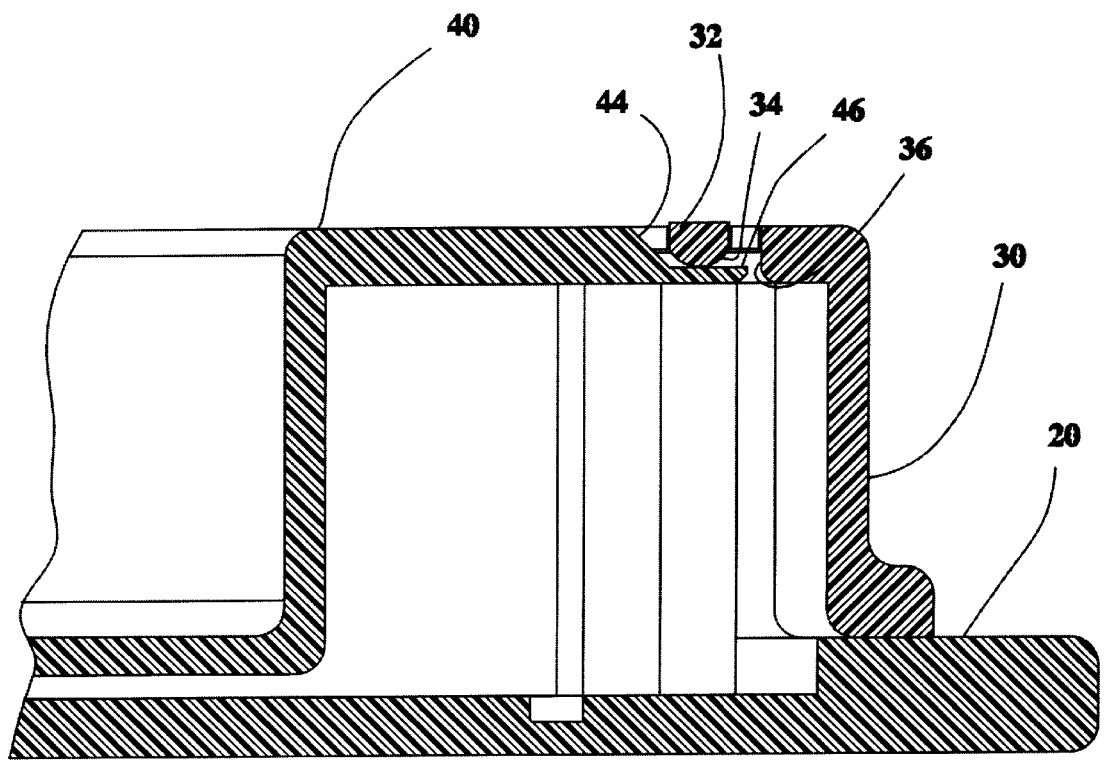
FIG. 3 is a partial cross-sectional view taken along line 3—3 of FIG. 1.

FIG. 3 is a partial cross-sectional view taken along section line 3—3. FIG. 3 shows one of the second spring fingers 32 of the cover 30 cut along the width of the spring finger 32 near the terminal or free end of the spring finger 32. The second spring fingers 32 contact a running surface 46 of the hub 40. Due to frictional reasons, as discussed above in regard to the first spring fingers, each of the second spring fingers 32 has a nub 34 located at the terminal or free end of the second spring fingers 32. The nubs 34 protrude from the second spring fingers 32 toward the running surface 46 of the hub 40. The second spring fingers 32 apply a spring force to the hub 40 through the nubs 34 to the running surface 46. The spring force applied by the second spring fingers 32 urges the hub towards the housing 40, which tends to stabilize the hub 40 and prevent the hub 40 from generating audible noise due to the hub 40 impacting the housing 20 and the cover 30. Three second spring fingers 32 are shown in FIG. 1, however, any number of spring fingers can be used. Furthermore, the size and shape of the nubs 34, as shown in FIGS. 3 and 4, are only one example of many acceptable sizes and shapes that provide the low friction contact between the second spring fingers 32 and the hub 40.

Figure 4:
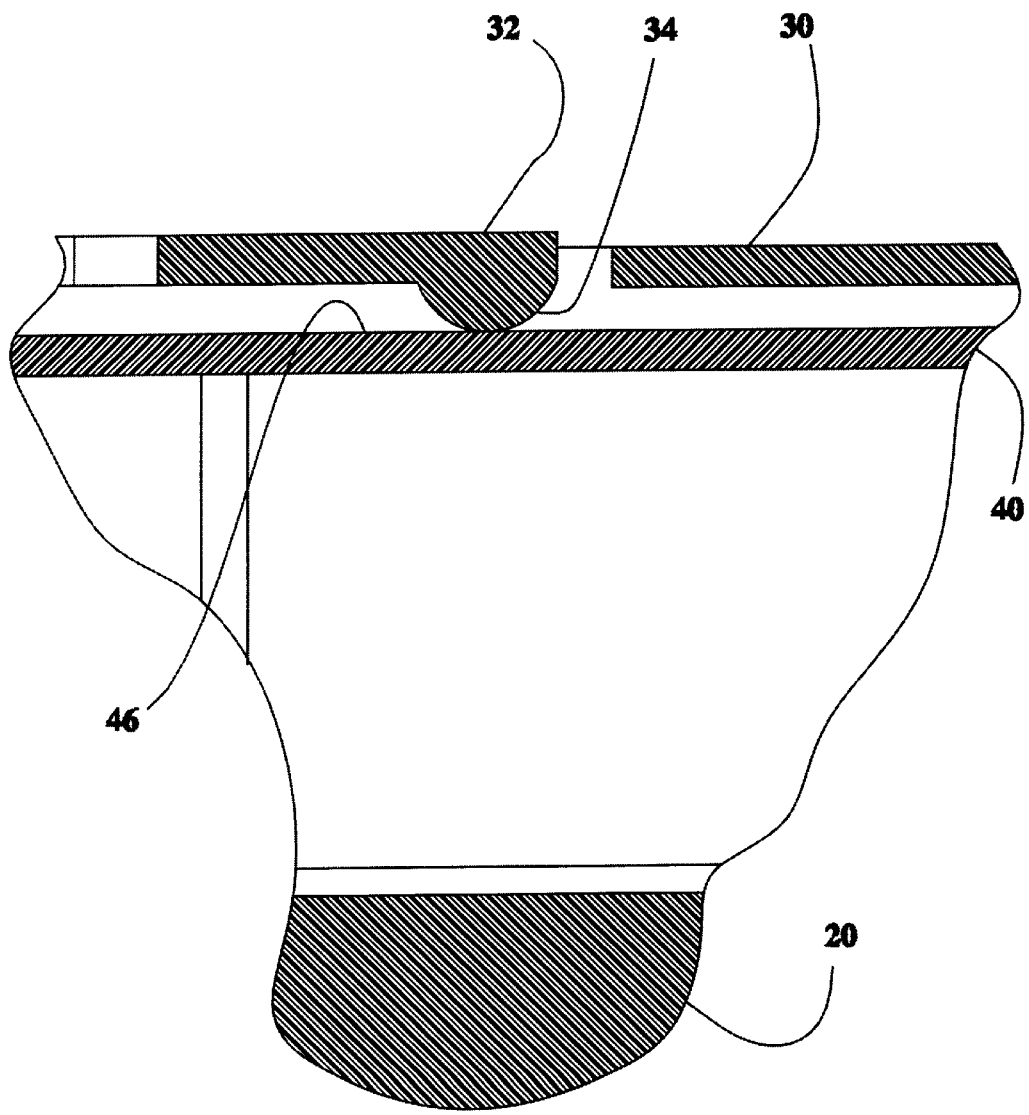
FIG. 4 is a partial cross-sectional view taken along line 4—4 of FIG. 1.

FIG. 4 is a partial cross-sectional view taken along section line 4—4 of FIG. 1. FIG. 4 shows one of the second spring fingers 32 along its length. A slight angular displacement of the second spring finger 32 can be seen as the second spring finger 32 contacts the running surface 46 of the hub 40. The second spring fingers 32 are dimensioned so as to provide a pre-load spring force to the hub 40 that is equivalent to the weight of the hub 40 when the assembly is at rest, i.e., not being vibrated. During operation, under vibratory loading, any additional deflection of the second spring fingers 32 results in additional force being applied to the hub 40 so as to stabilize the hub 40. Thus, the second spring fingers 32 urge the hub 40 toward the housing 20. The second spring fingers 32 take the form of cantilevered fingers protruding from the cover 30 and act as resilient springs and reduce axial vibration of the hub 40. However, the second spring fingers 32 do not need to be the shape as shown. Instead, any attachment or spring can be interposed between the cover 30 and the hub 40 to serve the same purpose. In a preferred embodiment the spring fingers 32 are integrally molded with the cover 30 made of an injection moldable polymer material, preferably ABS, that provides sufficient strength of the second spring fingers 22 to prevent breakage, but also having adequate resiliency so that the second spring fingers 32 are able to apply the required pre-load to the hub 40 and any other deflection generated loading experienced during operation.

The spring forces applied by the first and second spring fingers 22 and 32 is enough to dampen vibrations of the hub 40. Yet, the spring forces are not so great as to significantly increase the amount of torque required to rotate the hub 40 relative to the cover 30 and the housing 20.

A polymer material is the preferred material of construction for the hub 40.

Obviously, numerous modifications and variations of the present invention are possible in light of the above teachings. It is therefore to be understood that within the scope of the appended claims, the invention may be practiced otherwise than as specifically described herein.

What is claimed is:

1. A clockspring comprising:

a housing having first spring fingers;

a cover having second spring fingers, the cover mounted to the housing so as to form a cavity; and a hub rotatably mounted in the cavity, the hub having an axis of rotation, and wherein the first spring fingers urge the hub toward the axis of rotation of the hub when the first spring fingers are in a deflected position so as to center the hub within the cavity, and wherein the second spring fingers urge the hub toward the housing, and wherein each of the first spring fingers has a respective free end, and wherein the respective free end of each of the first spring fingers has a respective first nub, and wherein the hub has a first shoulder, and wherein the respective first nub of each of the first spring fingers contacts the first shoulder of the hub.

2. A clockspring comprising:

a housing having first spring fingers;

a cover having second spring fingers, the cover mounted to the housing so as to form a cavity; and a hub rotatably mounted in the cavity, the hub having an axis of rotation, and wherein the first spring fingers urge the hub toward the axis of rotation of the hub when the first spring fingers are in a deflected position so as to center the hub within the cavity, and wherein the second spring fingers urge the hub toward the housing, and wherein each of the first spring fingers has a respective free end, and wherein the respective free end of each of the first spring fingers has a respective first nub, and wherein each of the second spring fingers has a respective free end, and wherein the respective free end of each of the second spring fingers has a respective second nub, and wherein the hub has a first shoulder, and wherein the respective first nub of each of the first spring fingers contacts the first shoulder of the hub.

3. A clockspring comprising:

a housing having first spring fingers;

a cover having second spring fingers, the cover mounted to the housing so as to form a cavity; and a hub rotatably mounted in the cavity, the hub having an axis of rotation and a first shoulder, and wherein the first spring fingers urge the hub toward the axis of rotation of the hub when the first spring fingers are in a deflected position, and wherein each of the first spring fingers has a respective free end, and wherein the respective free end of each of the first spring fingers has a respective first nub, and wherein the respective first nub of each of the first spring fingers contacts the first shoulder of the hub, and wherein the second spring fingers urge the hub toward the housing.

4. A clockspring comprising:

a housing having first spring fingers;

a cover having second spring fingers, the cover mounted to the housing so as to form a cavity, and wherein each of the second spring fingers has a respective free end, and wherein the respective free end of each of the second spring fingers has a respective second nub; and a hub rotatably mounted in the cavity, the hub having an axis of rotation and a first shoulder, and wherein the first spring fingers urge the hub toward the axis of rotation of the hub when the first spring fingers are in a deflected position, and wherein each of the first spring fingers has a respective free end, and wherein the respective free end of each of the first spring fingers has a respective first nub, and wherein the respective first nub of each of the first spring fingers contacts the first shoulder of the hub, and wherein the second spring fingers urge the hub toward the housing.

* * * * *